(12) United States Patent
Kenishi

(10) Patent No.: US 8,769,991 B2
(45) Date of Patent: Jul. 8, 2014

(54) PRODUCTION OF FLUOROPHOSPHATE OPTICAL GLASS, AND PRODUCTION OF OPTICAL ELEMENT

(75) Inventor: Mikio Kenishi, Tokyo (JP)

(73) Assignee: Hoya Corporation, Tokyo (JP)

( * ) Notice: Subject to any disclaimer, the term of this patent is extended or adjusted under 35 U.S.C. 154(b) by 256 days.

(21) Appl. No.: 13/278,875

(22) Filed: Oct. 21, 2011

(65) Prior Publication Data

US 2012/0111061 A1 May 10, 2012

(30) Foreign Application Priority Data

Oct. 26, 2010 (JP) ................. 2010-239174

(51) Int. Cl.
*C03B 19/02* (2006.01)
*C03C 3/247* (2006.01)
(52) U.S. Cl.
CPC ............. *C03C 3/247* (2013.01); *C03B 19/02* (2013.01); *C03B 2201/70* (2013.01)
USPC ........ 65/134.1; 65/134.2; 65/134.3; 65/134.4
(58) Field of Classification Search
CPC ...... C03B 19/02; C03B 2201/70; C03C 3/247
USPC ............. 65/134.1–134.4; 501/44–48
See application file for complete search history.

(56) References Cited

U.S. PATENT DOCUMENTS

| | | | |
|---|---|---|---|
| 5,766,296 A * | 6/1998 | Moreau | 65/134.5 |
| 2004/0082460 A1* | 4/2004 | Yamane et al. | 501/48 |
| 2005/0054511 A1* | 3/2005 | Fujiwara et al. | 501/45 |
| 2007/0015651 A1* | 1/2007 | Endo | 501/50 |
| 2008/0187737 A1* | 8/2008 | Fujiwara et al. | 428/220 |
| 2009/0176641 A1* | 7/2009 | Kobayashi et al. | 501/78 |
| 2009/0247388 A1* | 10/2009 | Ikenishi | 501/44 |

FOREIGN PATENT DOCUMENTS

| | | |
|---|---|---|
| JP | 2010-59021 | 3/2010 |
| JP | 2010-59022 | 3/2010 |

OTHER PUBLICATIONS

U.S. Appl. No. 13/272,692 to Mikio Ikenishi, filed Oct. 13, 2011.

* cited by examiner

*Primary Examiner* — Queenie Dehghan

(74) *Attorney, Agent, or Firm* — Greenblum & Bernstein, P.L.C.

(57) ABSTRACT

In a method for producing a fluorophosphate optical glass comprising melting a glass raw material to give a molten glass, and refining, homogenizing and then quickly quenching the molten glass to produce the fluorophosphate optical glass, even if the glass is flown from a refining tank that is set to a high temperature to an operation tank that is set to a low temperature, bubbles are not generated in the glass.

The content of Fe in terms of $Fe_2O_3$ and the content of Cu in terms of CuO is controlled so that the total of the contents of Fe and Cu is 20 ppm or more, and the obtained fluorophosphate optical glass has such transmittance property that the internal transmittance in terms of a thickness of 10 mm becomes 98% or more at a wavelength region of at least from 400 to 500 nm.

5 Claims, No Drawings

PRODUCTION OF FLUOROPHOSPHATE OPTICAL GLASS, AND PRODUCTION OF OPTICAL ELEMENT

TECHNICAL FIELD

The present invention relates to a method for producing a fluorophosphate optical glass, and to a method for producing an optical element formed of the fluorophosphate optical glass.

BACKGROUND ART

A fluorophosphate optical glass has low dispersibility and abnormal dispersibility, and thus is a very useful glass as an optical material for correcting chromatic aberration at high-level. A fluorophosphate glass is produced by heating and melting a glass raw material, and rapidly quenching the obtained molten glass. Patent Documents 1 and 2 disclose typical techniques for producing a fluorophosphate glass by a melting method.

The method disclosed in Patent Document 1 is a method including melting an unvitrified raw material called a batch raw material, and the method disclosed in Patent Document 2 is a method including heating and melting a raw material called a cullet raw material that has been vitrified once.

Patent Document 1 discloses, as a preferable embodiment, a method for producing a fluorophosphate glass, which includes the steps of: melting a batch raw material in a melting container; feeding and defoaming the obtained molten glass to and in a refining tank; and further feeding and stirring the defoamed molten glass to and in an operation tank to homogenize.

Patent Document 2 discloses, as a preferable embodiment, a method for producing a fluorophosphate glass, which includes the steps of: introducing a cullet raw material in a melting container, heating and melting to give a molten glass; refining the glass by raising the temperature of the glass; removing bubbles; and stirring and homogenizing.

PRIOR ART DOCUMENTS

Patent Documents

[Patent Document 1] JP-A-2010-59021
[Patent Document 2] JP-A-2010-59022

SUMMARY OF THE INVENTION

Problem to be Solved by the Invention

However, when a fluorophosphate glass is mass-produced by the above-mentioned method of feeding and homogenizing the molten glass that has been subjected to a defoaming treatment in a refining tank to and in an operation tank, the following problems may be sometimes caused.

In the refining tank, it is preferable to raise the temperature of the molten glass so as to increase the efficiency of defoaming. On the other hand, in the operation tank, operations for preventing a gas component from remaining as bubbles are conducted by decreasing the temperature of the molten glass to increase the solubility against a gas that is slightly remaining in the glass, thereby incorporating the gas into the glass.

The molten glass remains in the refining tank for a time required for the defoaming treatment, after that flows from the refining tank that is set to a high temperature to the operation tank that is set to a low temperature; at this time, a problem that a large amount of bubbles is generated in the operation tank and the bubbles remain in the produced glass to deteriorate optical homogeneity occurs.

The present invention has been made for solving the above-mentioned problems, and the objects of the present invention is to provide a method for producing a fluorophosphate optical glass for stable mass-production of a high quality fluorophosphate optical glass, and to provide a method for producing an optical element for producing a high quality optical element by using the fluorophosphate optical glass produced by the above-mentioned method.

Means for Solving the Problem

Examples of the fluorophosphate glass include a fluorophosphate optical glass that shows a high transmittance over a wide range in the visible region, which is suitable for high-level correction for chromatic aberration, a glass in which absorption of light at a specific wavelength region has been increased, which is called a colored glass, a fluorescent glass for visualizing ultraviolet ray by adding Tb and the like, and the like. Typical examples of the colored glass include a copper-containing near-infrared ray absorption glass in which absorption of near-infrared ray has been increased by adding copper for a near-infrared ray absorption filter. A colored glass cannot achieve a high transmittance over a wide range in the visible region, and a fluorescent glass has an absorption in the visible region and generates fluorescence by irradiation of ultraviolet ray; therefore, both glasses are not suitable as glass materials for correcting chromatic aberration.

Meanwhile, in the case when a copper-containing near-infrared ray absorbing glass is melted, subjected to a defoaming treatment in a refining tank and then homogenized in an operation tank, the problem of foam formation in the operation tank, which was observed in the production of a fluorophosphate optical glass, is not almost caused.

The present inventors have studied the above-mentioned difference in the production process between a the fluorophosphate optical glass and the colored glass and made the following hypothesis.

In general, the solubility of a gas in a molten glass is high at a high temperature and small at a low temperature. A fluorophosphate glass is a glass having a relatively high solubility for a gas. Therefore, a large amount of gas is dissolved in a molten glass in a refining step. When the temperature of such molten glass in which a large amount of gas is dissolved, the gas dissolved in the molten glass reaches a supersaturated state. It is considered that foaming can be suppressed if the glass is rapidly quenched after homogenization is conducted while maintaining the supersaturated state; however, it is also considered that, if the glass is transferred from a refining tank that is set to a high temperature to the operation tank (homogenization area) that is set to a low temperature, the glass is exposed to rapid change in temperature, this acts as a stimulus, and no longer maintains the supersaturated state, and foam formation occurs at a burst.

It is considered the reason why the above-mentioned phenomenon does not occur in the production of a copper-containing near-infrared ray absorbing glass is that the copper ion in the molten glass absorbs the heat radiation released from the hot glass to decrease the effective temperature-descending velocity of the molten glass.

Since a fluorophosphate optical glass does not contain such additives that color the glass as a copper ion, heat energy is released outside by heat radiation, and the glass is thus exposed to high temperature change.

The present inventors have considered that foaming after refining can be suppressed same as in a copper-containing near-infrared ray absorbing glass, if a substance that absorbs heat radiation is added to a glass without deteriorating the excellent transmittance property of a fluorophosphate optical glass.

Therefore, if the foam formation after refining is suppressed by introducing iron (Fe) that has an effect to absorb heat radiation similarly to a copper ion into a glass and the upper limit of the addition amount of the iron is limited based on the transmittance property of the glass so that coloring by the iron causes no problem, a high quality optical glass in which gas bubbles are suppressed can be produced stably without deteriorating the advantages as a fluorophosphate optical glass. Furthermore, with respect to copper, by limiting the upper limit of the addition amount thereof that can be used as an optical glass based on the transmittance property of the glass, a high quality optical glass can be produced stably as in the case of iron.

The method for producing a fluorophosphate optical glass in the present invention is an invention that has been completed based on the above-mentioned findings, and is characterized by a method for producing a fluorophosphate optical glass, including melting a glass raw material to give a molten glass, and refining, homogenizing and quenching the molten glass to prepare the fluorophosphate optical glass, wherein the glass raw material is melted to give the molten glass including at least one of Fe and Cu, and the molten glass is refined and homogenized.

The method is characterized by that the total of the content of Fe in terms of $Fe_2O_3$ and the content of Cu in terms of CuO is adjusted to 20 ppm or more, and that the contents of Fe and Cu are controlled so that the obtained fluorophosphate optical glass has such transmittance property that the internal transmittance in terms of a thickness of 10 mm becomes 98% or more at a wavelength region of at least from 400 to 500 nm.

Hereinafter, the content of Fe means a value in terms of $Fe_2O_3$, and the content of Cu means a value in terms of CuO.

In addition, the content of Cu in the present invention is at a lower level than the content of Cu in a near-infrared ray absorbing glass, i.e., at a level at which coloring that poses a problem as an optical glass is not caused, and thus the fluorophosphate optical glass as an object of the present invention is clearly distinguished from a near-infrared ray absorbing glass.

When the total of the content of Fe and the content of Cu in the molten glass, i.e., the total of the content of Fe and the content of Cu in the glass prepared by the production method of the present invention, is lower than 20 ppm, it becomes difficult to effectively suppress foaming. Therefore, the total of the content of Fe and the content of Cu is adjusted to 20 ppm or more. A preferable lower limit of the total of the content of Fe and the content of Cu is 25 ppm, and a more preferable lower limit is 30 ppm.

On the other hand, the upper limit of the total of the content of Fe and the content of Cu in the molten glass is controlled based on the transmittance property of the optical glass. As the content of Fe increases, the transmittance at the shorter wavelength side of the visible region gradually decreases due to light absorption of Fe, and visible light of short wavelength does not gradually passed through. Since the advantages of the fluorophosphate optical glass are deteriorated in such case, the content of Fe is controlled so that the transmittance property of the glass satisfies the above-mentioned conditions. The same applies to Cu. That is, the upper limit of the total of the content of Fe and the content of Cu is defined indirectly by controlling the transmittance property of the glass. It can also be considered that the target of the upper limit of the total of the content of Fe and the content of Cu is 2,000 ppm.

The transmittance property used in the present invention is an internal transmittance. The internal transmittance is a transmittance from which surface reflection losses at the incident side and output side have been removed, and is well-known in the art and measured as follows:

A pair of flat plate-like samples that are formed of glasses having the same composition but have different thicknesses are provided. The both surfaces of the flat plate-like samples are planes that are parallel to each other and optically-polished. When the intensity of incident light that enters vertically in the optically-polished surface of the first sample is defined as $I_{in}(1)$ and the intensity of outgoing light that exits from the opposite surface is defined as $I_{out}(1)$, the transmittance $T_1$ including the surface reflection loss of the first sample is expressed an intensity ratio $I_{out}(1)/I_{in}(1)$. Similarly, when the intensity of incident light that enters vertically in the optically-polished surface of the second sample is defined as $I_{in}(2)$ and the intensity of outgoing light that exits from the opposite surface is defined as $I_{out}(2)$, the transmittance $T_2$ including the surface reflection loss of the second sample is expressed an intensity ratio $I_{out}(2)/I_{in}(2)$.

When the thickness of the first sample is defined as $d_1$ [mm] and the thickness of the second sample is defined as $d_2$ [mm], wherein $d_1 < d_2$, the internal transmittance τ at a thickness d. [mm] can be calculated by the following formula (1).

$$\tau = \exp[-d \times (\ln T_1 - \ln T_2)/\Delta d] \quad \text{Formula (1)}$$

wherein $\Delta d = d_2 - d_1$, and ln means a natural logarithm.

Since the present invention uses an internal transmittance in terms of a thickness of 10 mm as an index, the following formula (2) is obtained.

$$\tau(10\text{ mm}) = \exp[-10 \times (\ln T_1 - \ln T_2)/\Delta d] \quad \text{Formula (2)}$$

In the present invention, when the internal transmittance in terms of a thickness of 10 mm is in the above-mentioned range, even if the glass includes Fe or Cu, it can be used as a material for producing optical elements such as lenses and prisms, i.e., an optical glass, without any problems.

When the light absorption in the visible region is too higher than the absorption of infrared ray, it becomes difficult to obtain an excellent visible light transmitting property while obtaining a foaming-suppressing effect. However, since Fe and Cu show excellent absorption of infrared ray with small addition, an excellent foaming-suppressing effect can be obtained without deteriorating the excellent visible light transmitting property by incorporating Fe and Cu.

Furthermore, if the contents of Fe and Cu are amounts that correspond to an internal transmittance in the above-mentioned range, the devitrification durability of the glass is not decreased, and other various properties of the glass are not affected adversely.

Meanwhile, colored glasses and fluorescent glasses are not included in the fluorophosphate optical glass in the present invention. That is, the internal transmittance τ (10 mm) at a wavelength in the range of more than 500 nm and 1,000 nm or less also shows a high value, and the value is preferably 90% or more, more preferably 92% or more, still preferably 93% or more, further preferably 95% or more, further more preferably 96% or more, further still preferably 97% or more, and even still preferably 98% or more. Furthermore, the fluorophosphate optical glass in the present invention is free from a fluorescent substance such as Tb, Eu, Er or Nd.

The present invention is specifically effective in the case when it has a production process in which large temperature change is accompanied under a molten state. From these viewpoints, the present invention is specifically effective for a method including refining a molten glass in a refining area, flowing the molten glass to a homogenizing area, and successively conducting the step of refining in the refining area and the step of homogenizing in the homogenizing area. As an example, the above-mentioned preferable embodiment will be explained by referring to a glass production apparatus including a refining tank as a refining area and an operation tank as a homogenizing area, wherein the refining tank and operation tank are connected by a pipe.

The refining tank, operation tank and pipe connecting the both tanks each includes a temperature-control function for controlling the temperature of the molten glass inside thereof. The inlet and outlet for glass flow of the above-mentioned pipe are attached so that they are positioned below the glass liquid levels of the respective tanks, and the glass liquid levels in the two tanks are at approximately the same heights. While the molten glass flows from the high temperature refining tank to the low temperature operation tank through the pipe, the temperature of the glass is decreased by the heat exchange between the glass and pipe. Since the retention time of the glass in the pipe is short, the temperature of the glass is decreased within a short time. According to the method of the present invention, foaming in the operation tank can be suppressed effectively even against such a high temperature change.

In addition, the present invention is not limited to the above-mentioned preferable embodiment, but is also effective in a method of refining and homogenizing the molten glass in one tank. For example, even in the case when in order to increase productivity the glass temperature decreases immediately after completion of the refining step and the homogenization step is conducted, foam formation can be prevented by reducing temperature.

Furthermore, the present invention can be applied to any of a method using an unvitrified raw material (batch raw material) alone as a glass raw material, a method using only a cullet raw material, and a method using a batch raw material and a cullet raw material in combination.

EXAMPLES

Example 1

A melting tank, refining tank and operation tank are connected in this order through pipes, and a pipe for flowing out glass is connected to the bottom portion of the operation tank. The respective tanks and pipes are made of platinum alloy, and respectively provide a temperature-control function so that temperature control can be conducted independently.

Using this glass production apparatus, a fluorophosphate optical glass was produced as follows.

First, a batch raw material was formulated so that a desired optical property could be obtained, by using raw material compounds such as a phosphate such as a diphosphate, a fluoride and an oxide while considering that Fe (Cu) was included as an impurity and noting the contamination amount of Fe (Cu) in each raw material compound. The amount of Fe (Cu) introduced in the glass is determined by the contamination amounts of Fe (Cu) in the respective raw material compounds and the ratio of the respective raw material compounds in the batch raw material. Since the ratio of the respective compounds in the batch raw material is determined by the glass composition, raw material compounds having different incorporation amounts of Fe (Cu), i.e., raw material compounds having different purities were provided, and raw material compounds having a suitable level of purity for introducing a necessary amount of Fe (Cu) were selected therefrom. The selected raw material compounds were formulated and mixed sufficiently to prepare a batch raw material. The contents of Fe (Cu) in the batch raw materials are shown in Table 1.

TABLE 1

| | | Optical glass-1 | | Optical glass-2 | | Optical glass-3 | |
|---|---|---|---|---|---|---|---|
| Cation components (cation %) | $P^{5+}$ | 40 | | 20 | | 6 | |
| | $Al^{3+}$ | 22 | | 22.5 | | 33 | |
| | $Mg^{2+}$ | 0 | | 7 | | 7 | |
| | $Ca^{2+}$ | 0 | | 8 | | 28 | |
| | $Sr^{2+}$ | 0 | | 15 | | 17 | |
| | $Ba^{2+}$ | 38 | | 10 | | 5 | |
| | $Zn^{2+}$ | 0 | | 0 | | 0 | |
| | $Li^+$ | 0 | | 17 | | 2 | |
| | $Na^+$ | 0 | | 0 | | 1 | |
| | $K^+$ | 0 | | 0 | | 0 | |
| | $Y^{3+}$ | 0 | | 0.5 | | 1 | |
| | (Total) | 100 | | 100 | | 100 | |
| Anion components (anion %) | $F^-$ | 30.5 | | 62 | | 90.5 | |
| | $O^{2-}$ | 69.5 | | 37.8 | | 9.3 | |
| | $Cl^-$ | 0 | | 0.2 | | 0.2 | |
| | (Total) | 100 | | 100 | | 100 | |
| Additives (Note 1) (ppm) | $Fe_2O_3$ | 50 | 50 | 30 | 25 | 30 | 30 |
| | CuO | 10 | <2 | 2 | <1 | 10 | <1 |
| | $Fe_2O_3$ + CuO | 60 | >50 <52 | 32 | >25 <26 | 40 | >30 <31 |
| Property | Minimum value of internal transmittance $\tau$ (10 mm) | 99 | 99 | 99 | 99 | 99 | 99 |
| | Refractive index (nd) | 1.58 | | 1.5 | | 1.43 | |
| | Abbe's number (vd) | 71 | | 82 | | 95 | |
| | Glass transition temperature (° C.) | 550 | | 400 | | 440 | |

(Note 1): Addition amounts based on total amount including additives

Meanwhile, the properties of the optical glass were measured by the methods shown below.

(1) Minimum Value of Internal Transmittance $\tau$ (10 mm)

Internal transmittances $\tau$ in terms of a thickness of 10 mm were measured at a wavelength range of from 400 to 500 nm, and then the minimum value of the internal transmittance (10 mm) in the above-mentioned wavelength region was obtained.

(2) Refractive Index Nd and Abbe's Number vd

For a glass obtained by decreasing the temperature at a temperature descending rate of −30° C./hour, a refractive index nd and an Abbe's number vd were measured according to the method for measuring a refractive index in the standard of Japan Optical Glass Industries Associations.

(3) Glass Transition Temperature Tg

Using a thermomechanical analyzer (TMA) manufactured by Rigaku Corporation, a measurement was conducted at the temperature rising rate of 10° C./min.

Furthermore, the internal transmittances $\tau$ (10 mm) in terms of a thickness of 10 mm at a wavelength in the range of more than 500 nm and 1,000 nm or less of optical glasses 1 to 3 were 98% or more.

Next, a batch raw material was provided by conducting formulation so that a desired optical property could be obtained by using completely the same kinds of raw material compounds as mentioned above except that the purities were changed to ultrahigh purities, and mixing a suitable amount of $Fe_2O_3$ (CuO) with other raw material components for formulation so that the content of Fe (Cu) became the same as that mentioned above. The Fe (Cu) content in the batch raw materials are shown in Table 2.

TABLE 2

|  |  | Optical glass-1 | | Optical glass-2 | | Optical glass-3 | |
|---|---|---|---|---|---|---|---|
| Additives (Note 1) (ppm) | Fe$_2$O$_3$ | 50 | 50 | 30 | 25 | 30 | 30 |
|  | CuO | 10 | <2 | 2 | <1 | 10 | <1 |
|  | Fe$_2$O$_3$ + CuO | 60 | >50 <52 | 32 | >25 <26 | 40 | >30 <31 |
| Minimum value of internal transmittance τ (10 mm) |  | 99 | 99 | 99 | 99 | 99 | 99 |

(Note 1): Addition amounts based on total amount including additives

Furthermore, these batch raw materials were put into a melting tank, and heated and melted to give a molten glass. The molten glass vitrified in the melting tank flows into a refining tank through a pipe. When the molten glass passes through a pipe, the temperature of the molten glass is risen by heat exchange with the pipe. The temperature of the refining tank is set to be higher than that in the melting tank so as to promote a defoaming treatment. The molten glass defoamed in the refining tank passes through a pipe in which the temperature of the glass is decreased, and the glass flows into an operation tank of which temperature is set to be lower than those of the refining tank and melting tank.

In the operation tank, the molten glass is stirred and homogenized by a stirrer, after that the molten glass is flowed out from a pipe attached to the bottom and continuously poured into a casting mold that is disposed below the outlet of the pipe and quickly quenched. The glass formed into a plate form in the casting mold was withdrawn continuously in the horizontal direction, and directly annealed by passing through an annealing furnace to make a glass plate composed of a fluorophosphate optical glass having constant width and thickness.

The above-mentioned glass plate was then cut, grind and polished to make a glass sample. A refractive index nd, an Abbe's number vd and a spectral transmittance were measured by using this glass sample, and the presence or absence of bubbles in the glass sample was confirmed.

The obtained refractive index nd and Abbe's number vd were identical with the values shown in Table 1. The obtained spectral transmittance is shown in Table 2. Furthermore, the inside of the glass sample was visually observed, and enlargingly observed by using an optical microscope, no bubble or crystal was observed, and thus it was confirmed that a uniform and high quality optical glass could be obtained.

Next, when a fluorophosphate glass was made in a same manner as the above-mentioned example except that raw material compounds having low purities were used, and a spectral transmittance was measured, decrease in the transmittance at a short wavelength in the visible region was observed. The result of measurement is shown in Table 3.

Since the content of Fe (Cu) in the glass was evaluated to be excessive from the measurement result of the spectral transmittance, a fluorophosphate optical glass was made by changing to the batch raw material that was used in the above-mentioned example of which spectral transmittance was evaluated to be suitable as a fluorophosphate optical glass. It was confirmed that no foaming or devitrification was observed in this glass.

Therefore, by controlling the content of Fe (Cu) by the spectral transmittance of the glass, a fluorophosphate optical glass which is uniform and free from coloring can be produced stably while suppressing foam formation.

Comparative Example

When a glass was prepared in a same manner as the above-mentioned examples using only ultrapure raw material compounds, air bubbles were observed in the glass. The portion in which air bubbles are present does not satisfy homogeneity as an optical glass.

Example 2

A glass plate which was formed of the fluorophosphate optical glass prepared in Example 1, which did not contain bubbles and showed a high transmittance over a wide range in the visible region, was cut, ground and polished to make various spherical lenses and prisms.

Next, the glass prepared in Example 1, which did not contain bubbles and showed a high transmittance over a wide range in the visible region, was fed to a mold for press molding in a molten state, and press-molded to make a lens blank. The lens blank was annealed to remove distortion, and the refractive index was precisely conformed to a desired one, after that the lens blank was ground and polished to make various spherical lenses.

Furthermore, the glass prepared in Example 1, which did not contain bubbles and showed a high transmittance over a wide range in the visible region, was ground and polished to make a preform for precise press molding, and this preform was heated and subjected to precise press molding to make various non-spherical lenses.

The above-mentioned respective lenses enabled excellent chromatic aberration in combination with other glass lens.

The invention claimed is:
1. A method for producing a fluorophosphate optical glass, comprising melting a glass raw material to give a molten glass, and refining, homogenizing, and forming the molten glass to prepare the fluorophosphate optical glass,
   wherein the glass raw material is melted to give the molten glass containing at least one of Fe and Cu, and the molten glass is refined and homogenized,
   the total of the content of Fe in terms of Fe$_2$O$_3$ and the content of Cu in terms of CuO is 20 ppm or more, and

TABLE 3

|  |  | Optical glass-1 | | Optical glass-2 | | Optical glass-3 | |
|---|---|---|---|---|---|---|---|
| Additives (Note 1) (ppm) | Fe$_2$O$_3$ | 10000 | 10000 | 100 | 10000 | 10000 | 1000 |
|  | CuO | 10000 | <2 | 10000 | <2 | 1000 | 10000 |
|  | Fe$_2$O$_3$ + CuO | 20000 | 10000 | 10100 | 10000 | 11000 | 11000 |
| Minimum value of internal transmittance τ (10 mm) |  | 90 | 95 | 95 | 95 | 93 | 90 |

(Note 1): Addition amounts based on total amount including additives the contents of Fe and Cu are controlled so that the obtained fluorophosphate optical glass has such transmittance property that the internal transmittance in terms of a thickness of 10 mm is 98% or more at a wavelength region of at least from 400 to 500 nm and is 90% or more over the wavelength range of more than 500 nm and 1000 nm or less.

2. The method for producing a fluorophosphate optical glass according to claim 1, wherein the step of refining in the refining area and the step of homogenizing in the homogenizing area are conducted continuously by flowing the molten glass refined in a refining area to a homogenizing area.

3. The method for producing a fluorophosphate optical glass according to claim 1, wherein the molten glass from the homogenizing area is poured into a casting mold and formed into a glass formed product.

4. The method for producing a fluorophosphate optical glass according to claim 1, wherein the total of the content of Fe in terms of $Fe_2O_3$ and the content of Cu in terms of CuO is 2000 ppm or less.

5. A method for producing an optical element comprising:
melting a glass raw material to give a molten glass, and refining, homogenizing, and forming the molten glass to prepare the fluorophosphate optical glass,
wherein the glass raw material is melted to give the molten glass containing at least one of Fe and Cu, and the molten glass is refined and homogenized,
the total of the content of Fe in terms of $Fe_2O_3$ and the content of Cu in terms of CuO is 20 ppm or more, and
the contents of Fe and Cu are controlled so that the obtained fluorophosphate optical glass has such transmittance property that the internal transmittance in terms of a thickness of 10 mm is 98% or more at a wavelength region of at least from 400 to 500 nm and is 90% or more over the wavelength range of more than 500 nm and 1000 nm or less; and
producing an optical element from the obtained fluorophosphate optical glass.

* * * * *